United States Patent [19]
Hock

[11] 3,712,739
[45] Jan. 23, 1973

[54] AUTOCOLLIMATOR FOR DETERMINING THE POSITION OF TWO REFLECTORS RELATIVE TO EACH OTHER

[75] Inventor: Fromund Hock, Wetzlar, Germany

[73] Assignee: Ernst Leitz GmbH, Wetzlar, Germany

[22] Filed: Oct. 19, 1970

[21] Appl. No.: 82,108

Related U.S. Application Data

[63] Continuation-in-part of Ser. No. 734,099, June 3, 1968, abandoned.

[30] Foreign Application Priority Data

June 8, 1967 Germany............................L 56695

[52] U.S. Cl. ................356/118, 356/139, 356/153
[51] Int. Cl...............................................G01b 11/27
[58] Field of Search...............356/153, 114, 115, 118

[56] References Cited

UNITED STATES PATENTS 3,457,018  7/1969  Kloss.....................................356/153
3,552,859  1/1971  Snyder..................................356/153

FOREIGN PATENTS OR APPLICATIONS 1,094,485  0/1960  Germany..............................356/153
1,207,112  0/1965  Germany..............................356/153

Primary Examiner—Ronald L. Wibert
Assistant Examiner—J. Rothenberg
Attorney—Krafft & Wells

[57] ABSTRACT

In an autocollimator two systems of scale marks are projected by the autocollimator objective into infinity. With regard to their image-forming properties both systems are complementary to each other, preferably they are tinted in complementary colors, or are polarized in directions normal to each other. The images of the scale marks are reflected by a reference and a measuring mirror. Both mirrors reflect said images back through the objective into the image plane of the ocular where in the case of complementary colors owing to the additive color mixture only one scale mark will appear white.

6 Claims, 6 Drawing Figures

PATENTED JAN 23 1973 3,712,739
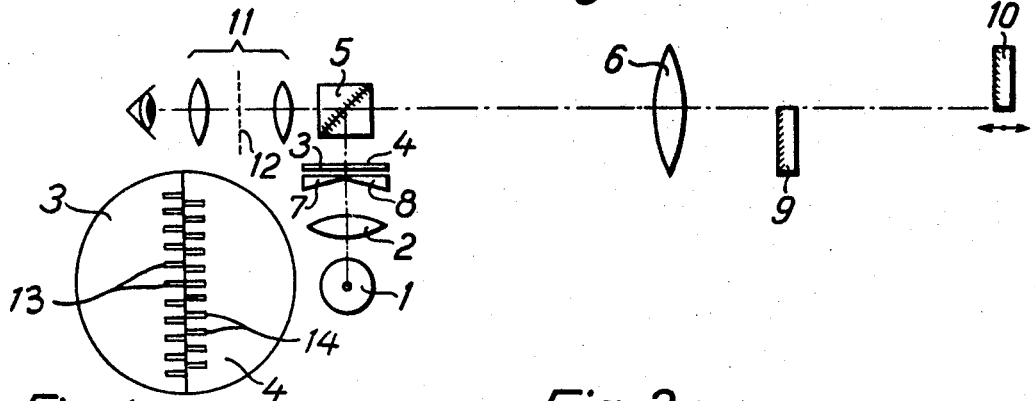
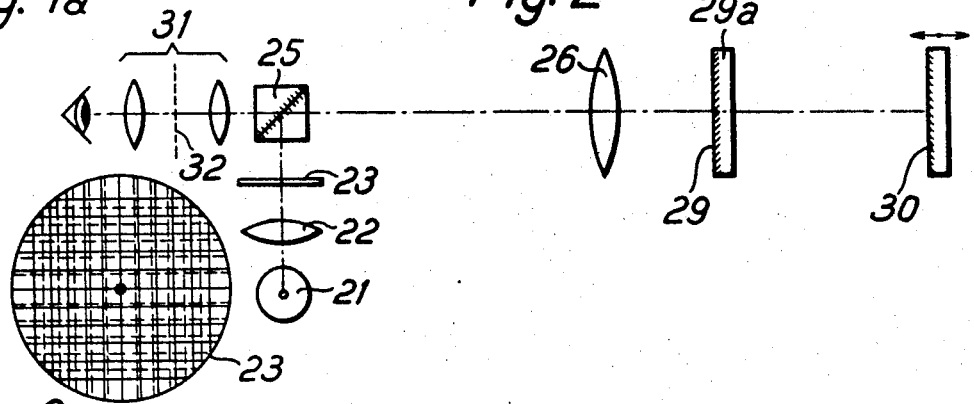
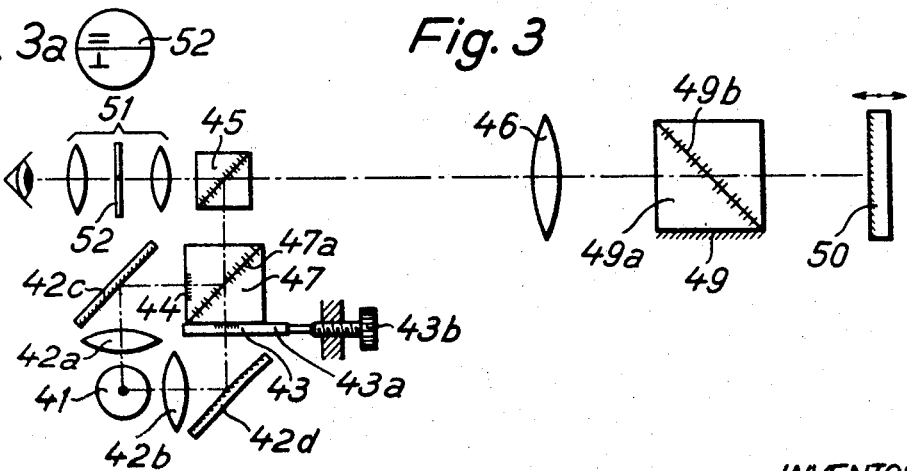
INVENTOR
FROMUND HOCK
BY
Krafft & Wells
ATTORNEYS

AUTOCOLLIMATOR FOR DETERMINING THE POSITION OF TWO REFLECTORS RELATIVE TO EACH OTHER

CROSS REFERENCE TO RELATED APPLICATION

This application is a continuation-in-part of my copending application Ser. No. 734,099, filed June 3, 1968 now abandoned.

BACKGROUND OF THE INVENTION

1. Field of the Invention

The invention relates to autocollimators for use in metrology, more particularly the invention pertains to determining the position of two reflected images relative to each other.

2. Description of the Prior Art

With many tasks in metrology which require the use of an autocollimator it is not possible to rig up the autocollimator stable relative to the object to be tested. This is specially so if the straightness of a machine bed is to be tested, with the measuring range extending over the full length of the bed. In such cases it is customary to use two autocollimation mirrors, one of which is secured to a stationary part of the object to be tested, while the other one is mounted on a movable part thereof, for example, on the carriage or table. Successively the position of the two mirrors is then measured and by subtraction of the results, the angular difference of the two mirror inclinations is obtained. However, with this method the measurement error is doubled and a calculation is necessary after measurement. This prior art method is, for example, described in "Metrology with Autocollimators," by K. J. Hume, page 111, Hilger and Watts Ltd., London, and in "Optical Tooling in Industry," by John D. McGrae, page 69, Hayden Book Company, Inc., New York.

SUMMARY OF THE INVENTION

It is an object of the present invention to provide a new autocollimator which eliminates the above described drawbacks of introducing twice the measurement error. It is a further object to provide an autocollimator the use of which does not require a particular calculation after measurement.

These objects are attained with an autocollimator comprising two systems of scale marks which are complementary to each other with regard to their image-forming properties. They may be tinted in complementary colors or may be polarized in directions normal to each other. Both systems of marks are projected into infinity by the objective. The images of the scale marks are reflected by a reference mirror and a measuring mirror. The images of both systems are reflected by said mirrors through the objective into the image plane of the ocular.

The two systems of scale marks may be of different grating constants and, further, one may be a grating having numbered marks, while the other grating may have unnumbered marks. Measurements in the two coordinates will be possible if both systems are two crossed grids. In this case, it is advisable to number the lines in one cross grid, while in the other one only the center of the coordinates is marked.

If grids are used it will also be advisable to arrange them in the function of interference filter lines on a carrier plate. The reference mirror should then be a dichroic beam splitter on a plane parallel glass plate.

If systems of marks are used which are polarized normal to each other, the reference mirror may be arranged on one side of a beam splitting cube of which the beam splitting plane is a polarizing splitter.

According to the particular arrangement of the two systems of scale marks, it may be advisable to make one of said systems adjustable in a direction normal to the optical axis with the adjustment itself being determinable.

DESCRIPTION OF THE DRAWINGS

The invention will be more fully comprehended from the following description when taken in conjunction with the appending drawings wherein:

FIG. 1 shows schematically an autocollimator according to the invention in a first embodiment wherein the autocollimator comprises a measuring mirror, a reference mirror, an opaque plate having transparent grating markings and optical wedges tinted in complementary colors;

FIG. 1a is an illustration of the gratings;

FIG. 2 shows the autocollimator according to the invention in a second embodiment and comprising two grids tinted in complementary colors, and a reference mirror having a reflecting surface which is a dichroic beam splitter;

FIG. 2a shows the two interspersed cross grids;

FIG. 3 shows an autocollimator according to the invention in a third embodiment comprising two systems of measuring marks which are polarized normal to each other; and FIG. 3a is a schematic plan view of a split field analyzer used in the third embodiment.

In FIG. 1 a light source 1 illuminates two grating plates 3 and 4 via a condenser 2. The grating plates 3 and 4 border on each other in the optical axis and are projected through a beam splitting cube 5 into infinity by an objective 6. Directly in front of the gratings 3,4 in the direction of light travel are provided two optical wedges 7, 8 also bordering on each other in the optical axis. The wedge 7 being tinted green and the wedge 8 being tinted red.

The grating plates 3 and 4 have an opaque background. The grating markings 13, 14 on the plates are transparent. Thus light from the light source 1 is directed by the condenser 2 through the wedges 7, 8 where it is tinted thereby and through the transparent markings 13, 14 on the grating plates 3, 4. The images of the two sets of grating markings are thus tinted by the respective optical wedges.

On the stationary object to be tested (not shown) is rigidly mounted a reference mirror 9, while on a movable part of said object is mounted the measuring mirror 10. This arrangement is completed by the ocular 11 into the intermediate image plane 12 of which the reflected images of the systems of gratings 3, 4 are projected.

This device functions as follows:

Owing to the tinting of the optical wedges 7, 8 the grating marks 13, 14 will be projected in complementary colors. Of these markings the grating markings 13 being the real measuring grating, may be numbered, while the reference grating markings 14, having a different grating constant, may remain unnumbered. The projected bundle of rays is thus split into two differently colored portions of rays which border on each other along the optical axis of the autocollimator. These two portions of rays are separately reflected by the reference mirror and the measuring mirror respectively. Owing to a slight inclination of both mirrors relative to the optical axis the colors of both gratings are projected by objective 6 superimposed in the intermediate image plane 12 of ocular 11. In this intermediate plane of all superimposed marks only one will appear white as a result of additive mixture of the complementary colors, while the remaining marks will show color fringes. The white mark indicates directly the difference of inclination angles of both mirrors.

In FIG. 2 a light source 21 illuminates through a condenser 22 a system of scale marks 23. The latter consists of two interspersed grids having different grating constants. The two grids may be tinted in complementary colors as interference filter systems and may be arranged on a carrier plate. The lines of one of these grids are numbered, while with the other only the center of coordinates is marked. Both grids are projected by objective 26 through a beam splitting cube 25 into infinity. The reference mirror 29 is a dichroic beam splitter and is arranged on a plane parallel glass plate 29a. The measuring mirror 30 is in known manner mounted on the movable part of the object to be tested. The ocular 31 with its intermediate image plane 32 again completes the arrangement.

This embodiment of the invention functions as follows:

The two cross grids 23 are projected by objective 26 into infinity. However, while the bundle of rays which projects the measuring mark system is transmitted through the dichroic beam splitter and is only reflected by the measuring mirror 30, the bundle of rays which projects the reference mark system is reflected by the dichroic beam splitter 29. Both reflected images of the cross grids are then projected by objective 26 into the intermediate image plane 32 in a superimposing manner. In this case also, there will appear only two crossed white grid lines owing to the additive mixture of complementary colors. These grid lines extend normal to each other. They represent the difference of the mirror inclination in two directions normal to each other. Owing to the mark in the center of coordinates in the reference system the two angles can directly be read. In the above embodiments, the angles of inclination are determined by the position of the graduations. For example, in FIG. 1, when the graduations of the gratings 3,4 and the image splitting prisms 7,8 are disposed at right angles to the plane of the drawing (as illustrated), a rotation of the mirror 10 is measured about an axis disposed in the image plane and at right angles to the optical axis, i.e., the plane defined by the two legs of the measuring angle is at right angles with respect to the plane of the drawing and is parallel to the optical axis. If the gratings 3,4 and the prisms 7,8 are pivoted together by 90° about the axis of the path of the illuminating rays, then rotation of the mirror 10 about an axis at right angles to the plane of the drawing will permit measurement as the angle to be measured will be in a plane parallel with the plane of the drawing. The angular direction in this embodiment is dependent upon the respective spatial position of the gratings 3,4 and the prisms 7,8.

In FIG. 3 is shown a light source 41 which illuminates through two condensers 42a, 42b and, after reflection from two mirrors 42c, 42d, is directed through two systems of scale marks 43, 44. The measuring mark system 43 is arranged on a carrier 43a which is displaceable normal to the optical axis by a graduated set screw 43b. The measuring mark system 43 is arranged adjacent one side of the beam splitting cube 47, while the reference mark system 44 is arranged directly on a cube side normal thereto. The splitting plane 47a of the cube 47 is a polarizing surface so that the two systems of measuring marks will appear polarized in directions normal to each other. Both systems of measuring marks are projected by objective 46 via beam splitting cube 45 into infinity.

The reference mirror 49 is arranged on one surface of an additional beam splitting cube 49a, the beam splitting plane 49b of which is also a polarizer. Cube 49a is arranged on a stationary part of the object to be tested (not shown), while the measuring mirror 50 is mounted on a movable part of said object. In the image plane of ocular 51 there is disposed a split field analyzer 52 the two fields of which are polarized in directions normal to each other.

The embodiment illustrated in FIG. 3 functions as follows:

As a result of the polarization of the two bundles of rays by which the two systems of marks are projected, only the reference mark system which has a grating constant different from the measuring mark system, is reflected by the polarizing splitter 49a and then by the reference mirror 49, while the bundle by which the measuring mark system is projected transmits the polarizing splitter 49a and is reflected by the measuring mirror 50. The two reflected images are transmitted by the objective 46 onto the split field analyzer 52 in the image plane of ocular 51 where they appear in a superimposed manner. Owing to the different directions of polarization, one system of marks will be visible only in one half and the other system will be visible only in the other half of the analyzer. However, both systems border directly on each other. They are located adjacent each other in known manner like a scale and a vernier scale. Those marks of both systems which in this position coincide completely indicate the angular difference of the inclination of both mirrors. The determinable displacement of the system of measuring marks 43 provides additionally a direct reading of said angular difference.

In FIG. 3, the angular direction is determined by the position of the scale marks 43 and 44 and it can be readily seen that in this case the pivoting of the mirror 50 about an axis at right angles to the plane of the drawing is to be measured. Thus, the measuring angle defines a plane in parallel with respect to the plane of the drawing.

I claim:

1. An autocollimator for determining the position of two mirrors relative to each other on an object to be tested, said autocollimator comprising in combination:

a measuring grating provided with transparent measuring marks and a reference grating provided with transparent reference marks; a light source illuminating said gratings;

first optical means in combination with said measuring grating and second optical means in combination with said reference grating, said first and second optical means having complementary optical properties and altering the properties of the light rays passing through the respective gratings from said light source;

a measuring mirror for reflecting an image of said measuring marks and mounted on a movable part of the object to be tested; a reference mirror for selectively acting and reflecting an image of said reference marks and mounted on a stationary part of the object to be tested;

lens means projecting images of said measuring marks and said reference marks into infinity in the direction of said measuring mirror and said reference mirror and positioned to project the images reflected by said measuring mirror and said reference mirror respectively into a common image plane, said images being superimposed in said common image plane by said mirrors whereby one of said measuring and one of said reference marks coincide in said image plane and are highlighted due to the addition of the complementary optical properties imparted by said first and second optical means indicating the difference of inclination angles of the mirrors; and an ocular positioned for viewing the marks in said image plane.

2. An autocollimator for determining the position of two mirrors relative to each other on an object to be tested, said autocollimator comprising in combination:

a measuring grating provided with measuring marks said and a reference grating provided with reference marks, said measuring and reference gratings tinted in complementary colors;

a light source illuminating said gratings;

a measuring mirror for reflecting an image of said measuring marks and mounted on a movable part of the object to be tested;

a dichroic reference mirror on the front side of a plane parallel glass plate for selectively acting and reflecting an image of said reference marks and mounted on a stationary part of the object to be tested;

lens means projecting images of said measuring marks and said reference marks into infinity in the direction of said measuring mirror and said reference mirror and positioned to project the images reflected by said measuring mirror and said reference mirror respectively into a common image plane, said images being superimposed in said common image plane by said mirrors, whereby one of said measuring and one of said reference marks coincide in said image plane and are highlighted due to the addition of the complementary colors imparted by said gratings indicating the difference of inclination angles of the mirrors; and an ocular positioned for viewing the marks in said image plane.

3. An autocollimator for determining the position of two mirrors relative to each other on an object to be tested, said autocollimator comprising in combination:

a measuring grating provided with measuring marks and a reference grating provided with reference marks;

a light source illuminating said gratings;

first optical means in combination with said measuring grating and second optical means in combination with said reference grating, said first and second optical means having complementary optical properties and altering the properties of the light rays passing through the respective gratings from said light source;

a measuring mirror for reflecting an image of said measuring marks and mounted on a movable part of the object to be tested;

a reference mirror for selectively acting and reflecting an image of said reference marks and mounted on a stationary part of the object to be tested;

lens means projecting images of said measuring marks and said reference marks into infinity in the direction of said measuring mirror and said reference mirror and positioned to project the images reflected by said measuring mirror and said reference mirror respectively into a common image plane, said images being superimposed in said common image plane by said mirrors, whereby one of said measuring and one of said reference marks coincide in said image plane and are highlighted due to the addition of the complementary optical properties imparted by said first and second optical means indicating the difference of inclination angles of the mirrors;

an ocular positioned for viewing the marks in said image plane; and one of said measuring and reference gratings is determinably laterally displaceable.

4. An autocollimator for determining the position of two mirrors relative to each other on an object to be tested, said autocollimator comprising in combination:

a measuring grating provided with measuring marks and a reference grating provided with reference marks, said measuring and reference gratings comprising two lined interference filter systems of complementary colors on a common carrier plate;

a light source illuminating said gratings;

a measuring mirror for reflecting an image of said measuring marks and mounted on a movable part of the object to be tested;

a reference mirror for selectively acting and reflecting an image of said reference marks and mounted on a stationary part of the object to be tested;

lens means projecting images of said measuring marks and said reference marks into infinity in the direction of said measuring mirror and said reference mirror and positioned to project the images reflected by said measuring mirror and said reference mirror respectively into a common image plane, said images being superimposed in said common image plane by said mirrors, whereby one of said measuring and one of said reference marks coincide in said image plane and are highlighted due to the addition of the complementary colors imparted by said interference filter means indicating the difference of inclination angles of the mirrors; and an ocular positioned for viewing the marks in said image plane.

5. An autocollimator for determining the position of two mirrors relative to each other on an object to be tested, said autocollimator comprising in combination:

a measuring grating provided with transparent measuring marks and a reference grating provided with transparent reference marks, said reference grating being adjacent to and parallel with said measuring grating;

a light source illuminating said gratings;

a first colored optical wedge positioned between the light source and said measuring grating, and a second complementary colored optical wedge positioned between the light source and the reference grating, the colors of said wedges being complementary and tinting light transmitted by the marks on said gratings, said wedges being adjacent to each other in a plane normal to the direction of light travel from the light source through the measurement and reference gratings;

a measuring mirror for reflecting an image of said measuring marks and mounted on a movable part of the object to be tested;

a reference mirror for reflecting an image of said reference marks and mounted on a stationary part of the object to be tested;

optical means projecting images of said measuring marks and said reference marks into infinity in the direction of said measuring mirror and said reference mirror and positioned to project the images reflected by said measuring mirror and said reference mirror respectively into a common image plane, said images being superimposed in said common image plane by said mirrors, whereby one of said measuring and one of said reference marks coincide in said image plane and are highlighted in white due to the additive color mixture of the complementary colors imparted by said optical wedges indicating the difference of inclination angles of the mirrors; and an ocular positioned for viewing the marks in said image plane.

6. An autocollimator for determining the position of two mirrors relative to each other on an object to be tested, said autocollimators comprising in combination:

a measuring grating provided with measuring marks and a reference grating provided with reference marks;

a light source illuminating said gratings;

first optical means in combination with said measuring grating and second optical means in combination with said reference grating, said first and second optical means having complementary optical properties and altering the properties of the light rays passing through the respective gratings from said light source;

a measuring mirror for reflecting an image of said measuring marks and mounted on a movable part of the object to be tested;

a reference mirror for selectively acting and reflecting an image of said reference marks and mounted on a stationary part of the object to be tested;

lens means projecting images of said measuring marks and said reference marks into infinity in the direction of said measuring mirror and said reference mirror and positioned to project the images reflected by said measuring mirror and said reference mirror respectively into a common image plane, said images being superimposed in said common image plane by said mirrors, whereby one of said measuring and one of said reference marks coincide in said image plane and are highlighted due to the addition of the complementary optical properties imparted by said first and second optical means indicating the difference of inclination angles of the mirrors;

an ocular positioned for viewing the marks in said image plane; said first and second optical means comprising polarizing means to polarize the light passing through said measuring and reference gratings in two directions normal to each other; and a polarizing beam splitting cube in the path of the polarized light, one side of said cube being the reference mirror.

* * * * *